United States Patent
Ho et al.

(10) Patent No.: US 6,493,022 B1
(45) Date of Patent: Dec. 10, 2002

(54) SECURITY SYSTEM FOR NOTIFICATION OF AN UNDESIRED CONDITION AT A MONITORED AREA WITH MINIMIZED FALSE ALARMS

(75) Inventors: Shu-Kuang Ho, Carlisle; Xiu-Wei Zhao, Chelmsford, both of MA (US)

(73) Assignee: Biscom, Inc., Chelmsford, MA (US)

( * ) Notice: Subject to any disclaimer, the term of this patent is extended or adjusted under 35 U.S.C. 154(b) by 0 days.

(21) Appl. No.: 09/263,360

(22) Filed: Mar. 5, 1999

(51) Int. Cl.[7] ............................................. H04N 7/18
(52) U.S. Cl. ...................... 348/154; 348/172; 382/288
(58) Field of Search ........................... 348/152, 154, 348/155, 171, 172; 358/438, 440; 382/103, 288

(56) References Cited

U.S. PATENT DOCUMENTS

| | | | | |
|---|---|---|---|---|
| 3,812,287 A | | 5/1974 | Lemelson | 176/6.8 |
| 3,828,125 A | | 8/1974 | Fagan et al. | 176/6.8 |
| 4,249,207 A | * | 2/1981 | Harman et al. | 358/108 |
| 4,777,526 A | | 10/1988 | Saitoh et al. | 358/108 |
| 5,202,759 A | * | 4/1993 | Laycock | 358/108 |
| 5,500,904 A | * | 3/1996 | Markandey et al. | 382/103 |
| 6,271,752 B1 | * | 8/2001 | Vaios | 340/541 |

FOREIGN PATENT DOCUMENTS

GB    2258579 A  * 10/1993

* cited by examiner

*Primary Examiner*—Chris Kelley
*Assistant Examiner*—George A Bugg
(74) *Attorney, Agent, or Firm*—Banner & Witcoff, LTD

(57) ABSTRACT

The present invention is a security monitoring system which effectively monitors a large number of areas in a cost effective manner using already existing communications infrastructure. More specifically, the method and apparatus of the present invention warns at least one security post of an undesired condition at a monitored area by sending a fax of an image of the monitored area via a phone line and/or by sending an E-mail of a color image via a global telecommunications network such as the Internet. Generally, the present invention includes a camera for creating a first image of the monitored area at a first time point and for creating a second image of the monitored area at a second time point. In addition, a data storage device stores the first image and the second image, and an image processor, coupled to the data storage device, compares the first image with the second image. A modem, coupled to the image processor, sends a fax of the second image to the at least one security post if the second image is substantially different from the first image. The present invention may further send via the modem a JPEG color image of the second image as an electronic mail to a predetermined security post if the second image is substantially different from the first image.

16 Claims, 5 Drawing Sheets

SECURITY SYSTEM FOR NOTIFICATION OF AN UNDESIRED CONDITION AT A MONITORED AREA WITH MINIMIZED FALSE ALARMS

TECHNICAL FIELD

The present invention relates generally to security systems that monitor for undesired conditions at a monitored area, and more particularly to an efficient and low cost method and apparatus for notifying at least one security post of an undesired condition at a monitored area with low incidence of false alarms.

BACKGROUND OF THE INVENTION

Security monitoring systems now commonly use a video camera for monitoring an area. In some cases, the image of the monitored area stays constant with time for a relatively long time period. Thus, some security systems detect for a change in the image of the monitored area with time for detecting movement within the monitored area. For example, U.S. Pat. No. 3,812,287 to Lemelson, U.S. Pat. No. 3,828,125 to Fagan et al., and U.S. Pat. No. 4,777,526 to Saitoh et al. disclose a security system that detects for a change in the image of the monitored area with time for detecting undesired movement within the monitored area.

Unfortunately, with the prior art security system, when an undesired movement within the monitored area is detected, the means for dealing with this detection may not be effective for quickly preventing damage to the monitored area. In order to minimize false alarms, a security guard typically views the image of the monitored area before traveling to the monitored area when an undesired condition has been detected. U.S. Pat. No. 3,812,287 and U.S. Pat. No. 3,828,125 disclose a security system having a monitor that displays an image and that generates an alarm to draw the attention of a security guard to the monitor when an undesired condition has been detected. However, such a system is not effective for monitoring a large number of areas by one security guard. For example, it may be desired to monitor a neighborhood of hundreds of houses. In that case, a monitor for each of the houses would be needed with these prior art security systems which would be costly.

U.S. Pat. No. 4,777,526 discloses a security monitor system which is designed to transmit video signals from a plurality of video information sources via a common transmission line using modulation techniques. Although this security system is amenable for monitoring a large number of areas, additional infrastructure including the modulators, transmitters, and receiving circuitry is needed which adds to the complexity and cost of the system.

Thus, an improved security monitor system wherein one or a few security guards can monitor a large number of areas in a cost effective manner is desired.

SUMMARY OF THE INVENTION

Accordingly, the present invention is a security monitor system which effectively monitors a large number of areas in a cost effective manner using already existing communications infrastructure. More specifically, the method and apparatus of the present invention warns at least one security post of an undesired condition at a monitored area by sending a fax via a phone line and/or by sending an E-mail with an attachment of a JPEG color image of the monitored area via a global telecommunications network such as the Internet.

Generally, the present invention includes a camera for creating a first image of the monitored area at a first time point and for creating a second image of the monitored area at a second time point. In addition, a data storage device stores the first image and the second image, and an image processor, coupled to the data storage device, compares the first image with the second image. A fax modem, coupled to the image processor, sends a fax of the second image to the at least one security post if the second image is substantially different from the first image.

The present invention may further include an Internet modem, coupled to the image processor, for sending a JPEG file of the second image as an electronic mail to a predetermined security post if the second image is substantially different from the first image.

The present invention may be used to particular advantage when a dual tone multi-frequency detector detects a remote request via a phone line for a requested fax of the second image and for accepting a fax number entered via the phone line to which the requested fax is to be sent. The image processor then sends a fax of the second image to that accepted fax number.

The image processor within the security system of the present invention repeats comparing another first image to another second image every predetermined time period.

The present invention may be used to particular advantage when the algorithm for comparing the second image to the first image includes determining and comparing the following four parameters of the first image and the second image: an average pixel value, a standard deviation pixel value, an x-coordinate pixel massive center, and a y-coordinate pixel massive center. The first image is substantially different from the second image if the average pixel value of an image block in the first image is substantially different from the average pixel value of the image block in the second image or if the standard deviation pixel value of the image block in the first image is substantially different from the standard deviation pixel value of the image block in the second image or if the x-coordinate pixel massive center of the image block in the first image is substantially different from the x-coordinate pixel massive center of the image block in the second image or if the y-coordinate pixel massive center of the image block in the first image is substantially different from the y-coordinate pixel massive center of the image block in the second image.

In another embodiment of the present invention, the security monitoring system further includes a plurality of cameras with each camera monitoring a respective monitored area. The plurality of cameras are coupled to a computer having an image processor which multiplexes between the plurality of cameras to detect an undesired condition at the respective monitored area of any selected one of the plurality of cameras at a given time.

In this manner, the present invention upon detecting an undesired condition at the monitored area uses already available technology such as fax over the phone lines or electronic mail over the Internet for alerting at least one security post of the undesired condition. As a result, the present invention is a cost effective security system which may monitor a large number of areas. Any area may fax or E-mail an image to a security post such as the police station. The security guard views the faxed and/or electronically mailed image to ensure that a trip to the monitored area is warranted. Thus, false alarms are minimized with the present invention.

These and other features and advantages of the present invention will be better understood by considering the following detailed description of the invention which is presented with the attached drawings.

BRIEF DESCRIPTION OF THE DRAWINGS

FIG. 3, including

The figures referred to herein are drawn for clarity of illustration and are not necessarily drawn to scale. Elements having the same reference number in FIGS. 1, 2, 3, 4, and 5 refer to elements having similar structure and function.

DETAILED DESCRIPTION

Figure 1:
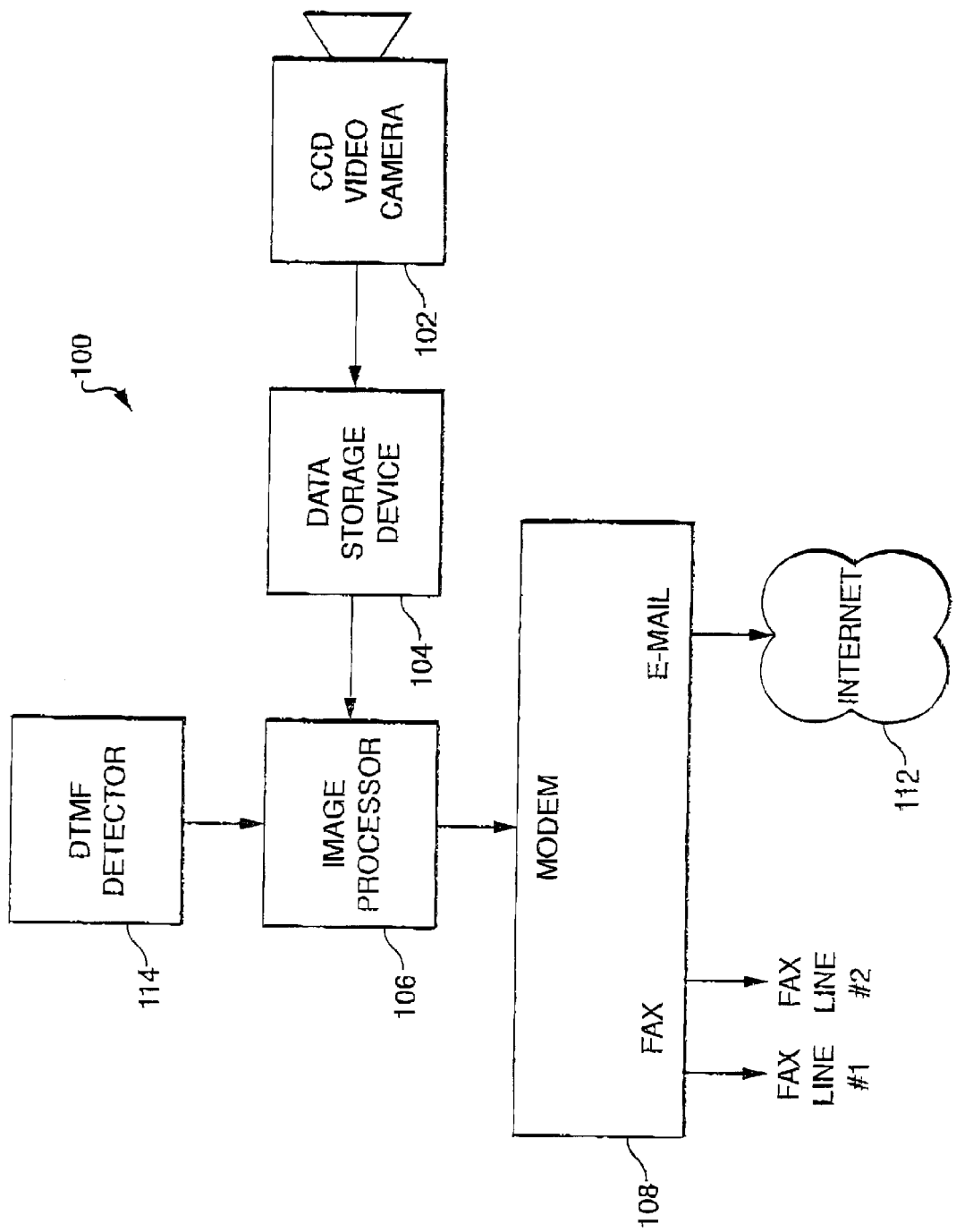
FIG. 1 shows a block diagram of the components of a security monitoring system according to one embodiment of the present invention.

Referring to FIG. 1, a security monitoring system 100 of the present invention includes a CCD (Charge Coupled Device) video camera 102 for generating video images of the monitored area. The CCD video camera 102 is coupled to a data storage device 104 which stores images generated by the CCD video camera 102. An image processor 106 is coupled to the data storage device 104 and determines whether any undesired condition exists at the monitored area.

If an undesired condition exists at the monitored area, then the image processor 106 informs at least one security post of that undesired condition via a modem 108. The modem 108 has the capability of faxing an image from the video camera 102 to a plurality of fax lines over the public telephone network. The modem 108 also has the capability of sending an electronic mail of a JPEG color image from the video camera 102 via the Internet 112. Preferably, processor 106 provides, with an image to be faxed by a method and apparatus known in the facsimile art, the telephone number, the time and the date and other indicia, as required, for identifying the location of monitor system 100 which has detected a disturbance. In addition, processor 106 also provides, with the image to be emailed by a known method and apparatus of a known system, the time, the date and the email address to an image to be emailed and other indicia, as required, for identifying the location of the security system 100 which has detected a disturbance.

The security monitoring system 100 of the present invention further includes a DTMF (Dual Tone Multi Frequency) detector 114 coupled to the image processor 106. The DTMF detector 114 detects from a remote security post a remote request for a requested fax of an image from the CCD video camera 102. The remote security post dials in this request over the public telephone system and also dials in a fax number to which the requested fax is to be sent. The DTMF detector accepts this fax number such that the image processor 106 may send the requested fax to this fax number.

Figure 2:
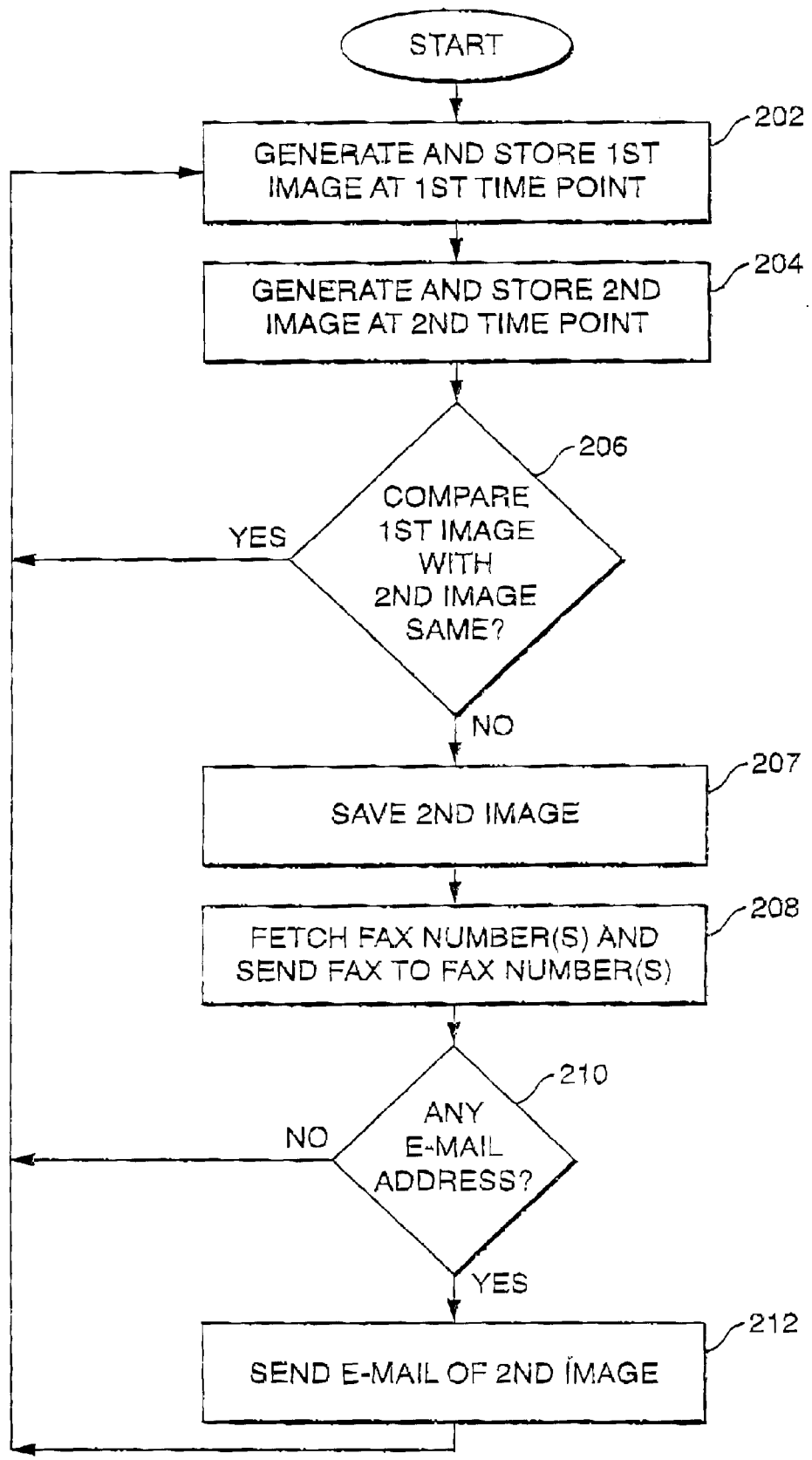
FIG. 2 shows a flowchart of the steps of operation of the security monitoring system of FIG. 1, according to another embodiment of the present invention.

Referring to FIG. 2, a flowchart of the steps of operation of the security monitoring system 100 of the present invention includes a step of generating by the CCD video camera 102 and storing by the data storage device 104 a first image of the monitored area at a first time point (step 202 in FIG. 2). The present invention also includes a step of generating by the CCD video camera 102 and storing by the data storage device 104 a second image of the monitored area at a second time point (step 204 in FIG. 2).

The image processor 106 then compares the first image with the second image (step 206 in FIG. 2). If the first image is substantially similar to the second image, then the image processor 106 controls the CCD video camera 102 to generate another first image and another second image by returning to step 202.

If the first image is substantially different from the second image, then movement in the monitored area has been detected. Such a movement typically indicates an undesired condition at the monitored area. The image processor 106 then saves the second image for further processing (step 207 of FIG. 2). For example, the image processor 106 controls the modem 108 to send a fax of the second image to at least one security post (step 208 of FIG. 2). The modem 108 is designed to be coupled to a plurality of fax lines as known to one of ordinary skill the art such that a fax may be sent to a plurality of fax machines simultaneously. Each of the plurality of fax lines is coupled to a respective security post. For example, if a monitored area is a place of business, one of the fax lines may be coupled to a fax machine at a police station and another of the fax lines may be coupled to a fax machine at the residence of the business owner. The operator of the security monitor system may program the image processor 106 with at least one fax number to which the second image should be faxed when the first image is substantially different from the second image.

In addition, if any E-mail address has been programmed into the image processor 106 (step 210 of FIG. 2), then a JPEG color image of the second image is E-mailed to that E-mail address (step 212 of FIG. 2) via the modem 108. Technology for generation of a JPEG color image from the second image stored in the data storage device 104 and a modem which sends such an E-mail via the Internet 112 are known to one of ordinary skill in the art. The security monitoring system 100 then returns to. generating another first image and another second image by returning to step 202 in FIG. 2. In this manner, the generation of the first image and the second image and the comparison of the first image with the second image is typically repeated every predetermined time period.

Referring to FIG. 3, an algorithm within the image processor 106 for comparing the first image with the second image is illustrated. Referring to FIG. 3e, an image 302 is divided into a grid of image blocks. In the example of FIG. 3e, the image 302 is divided into a grid of three rows by four columns of image blocks. However, the present invention may be used with any number of image blocks for an image.

Figure 3A:
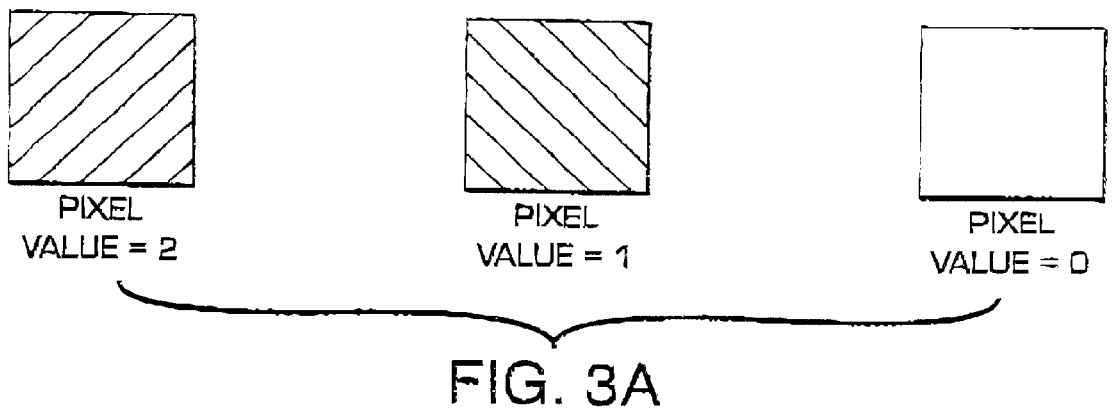
FIGS. 3a, 3b, 3c, 3d, and 3e, illustrates an algorithm for comparing a first image with a second image of the monitored area, according to another embodiment of the present invention.

Within each image block, parameters related to pixel values are calculated. Referring to FIG. 3a, pixel values are assigned to each pixel within an image block. A pixel within an image block may be any number of colors. However, for simplicity of illustration, example pixel values for three colors are described herein for a dark shake, a gray shade, and a light shade. Referring to FIG. 3a, for example, if a pixel has a dark shade, then a pixel value of "2" is assigned. If a pixel has a gray shade, then a pixel value of "1" is assigned. If a pixel has a light shade, then a pixel value of "0" is assigned.

An example algorithm for comparing the first image with the second image determines the following four parameters for each image block within an image: an average pixel value, a standard deviation pixel value, an x-coordinate pixel massive center, and a y-coordinate pixel massive center. The average pixel value (AV) for an image block is calculated as follows:

$$AV = \Sigma P_i / n$$

where $P_i$ is the pixel value of each pixel within that image block and n is the total number of pixels within that image block.

Figure 3B:
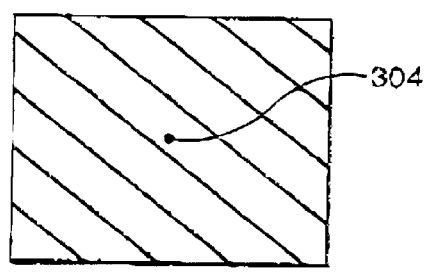
Figure 3C:
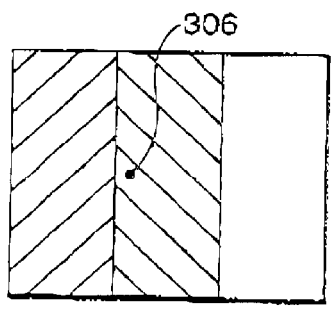

Referring to FIG. 3b and FIG. 3c, the average pixel value of the image block of FIG. 3b is 1, and the average pixel value of the image block of FIG. 3c is also 1, even though the image blocks of FIGS. 3b and 3c are visibly different. Thus, an additional parameter that is compared is the standard deviation pixel value (SD) for an image block which is calculated as follows:

$$SD = \mathrm{sqrt}\,(\Sigma (P_i - AV)^2 / n)$$

where "sqrt" denotes the square root function, $P_i$ is the pixel value of each pixel within that image block, AV is the average pixel value for that image block, and n is the total number of pixels within that image block. Referring to FIGS. 3b and 3c, the standard deviation pixel value of the image block of FIG. 3b is 0 but the standard deviation pixel value of the image block of FIG. 3c is greater than 0.

Figure 3D:
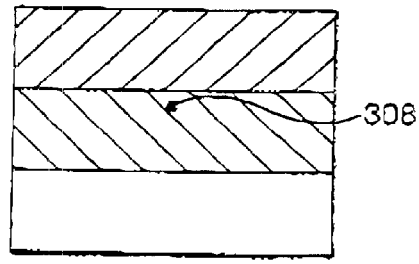
Figure 3E:
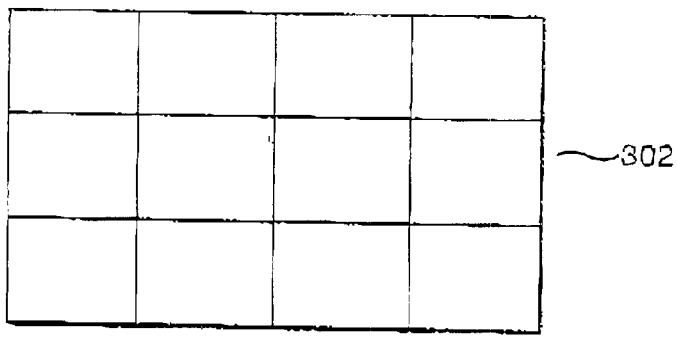

Referring to FIG. 3c and FIG. 3d, the average pixel value of the image block of FIG. 3c is 1, and the average pixel value of the image block of FIG. 3d is also 1. In addition, the standard deviation pixel value of the image block of FIG. 3c is equal to the standard deviation pixel value of the image block of FIG. 3d, even though the image blocks of FIGS. 3c and 3d are visibly different.

To differentiate between the image blocks of FIGS. 3c and 3d, the x-coordinate pixel massive center and a y-coordinate pixel massive center for an image block are also determined. The x-coordinate pixel massive center (X) is calculated as follows:

$$X = \Sigma x_i P_i / \Sigma P_i$$

where $x_i$ is the respective x-coordinate of each pixel and $P_i$ is the respective pixel value of each pixel within an image block. Similarly, the y-coordinate pixel massive center (Y) is calculated as follows:

$$Y = \Sigma y_i P_i / \Sigma P_i$$

where $y_i$ is the respective y-coordinate of each pixel and $P_i$ is the respective pixel value of each pixel within an image block.

Referring to the example of FIG. 3, the x-coordinate pixel massive center and the y-coordinate pixel massive center of the image block of FIG. 3b are the coordinates of the point 304 of FIG. 3b. The x-coordinate pixel massive center and the y-coordinate pixel massive center of the image block of FIG. 3b are toward the center of the image block since the image block of FIG. 3b is relatively uniform throughout.

The x-coordinate pixel massive center and the y-coordinate pixel massive center of the image block of FIG. 3c are the coordinates of the point 306 of FIG. 3c. Comparing FIGS. 3b and 3c, the x-coordinate pixel massive center and the y-coordinate pixel massive center of the image block of FIG. 3c is situated more toward the left of the image block since a darker pixel is present toward the left of the image block in FIG. 3c.

The x-coordinate pixel massive center and the y-coordinate pixel massive center of the image block of FIG. 3d are the coordinates of the point 308 of FIG. 3d. Comparing FIGS. 3b and 3d, the x-coordinate pixel massive center and the y-coordinate pixel massive center of the image block of FIG. 3d is situated more toward the top of the image block since a darker pixel is present toward the top of the image block in FIG. 3d.

Thus, with the x-coordinate pixel massive center and the y-coordinate pixel massive center, the image blocks of FIGS. 3b, 3c, and 3d are correctly deemed to be substantially different. The algorithm within the image processor 106 of the present invention determines the four parameters of an average pixel value, a standard deviation pixel value, an xcoordinate pixel massive center, and a y-coordinate pixel massive center for each image block within an image. Then, these parameters are compared for each respective image block of the first image and of the second image.

If these parameters are sufficiently different for a first respective image block within the first image and a second respective image block within the second image, then those respective image blocks are deemed to be sufficiently different. If more than a predetermined number of respective image blocks are sufficiently different for the first image and the second image, then the algorithm of the present invention deems the first image to be sufficiently different from the second image.

In this manner, the present invention effectively monitors for an undesired condition at a monitored area. When an undesired condition is detected at a monitored area, at least one security post, such as the police station or an owner of the monitored area, is apprised of the undesired condition using already existing communications infrastructure. A security post is notified by being faxed or E-mailed the image of the monitored area when an undesired condition is detected.

Figure 4:
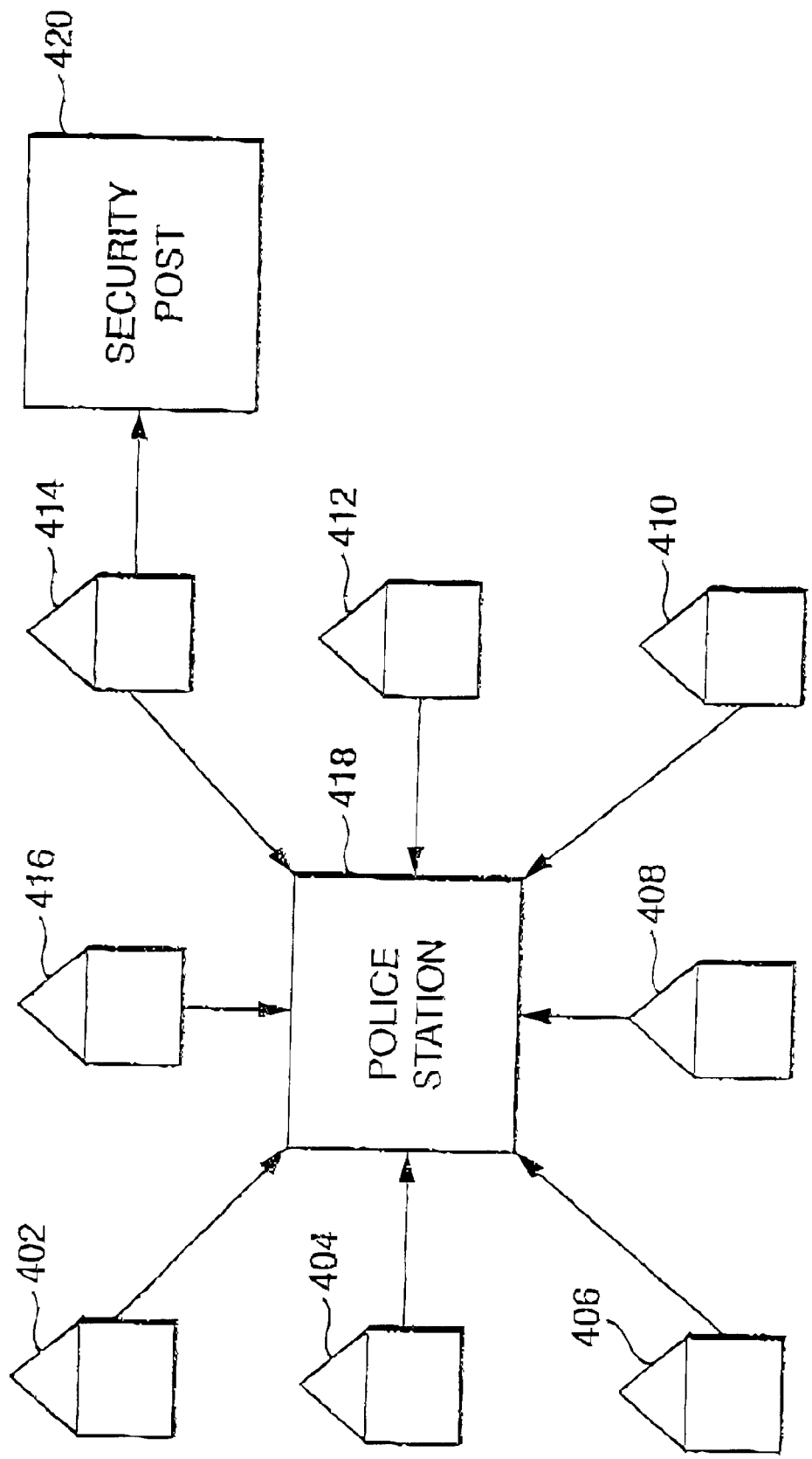
FIG. 4 illustrates how a large number of areas may be monitored by a security post with the security monitoring system of the present invention.

In addition, because the existing infrastructure of the telephone lines or the Internet is used with the present invention, a relatively large number of areas may be cost effectively monitored by one security post. Referring to FIG. 4, a first monitored area 402, a second monitored area 404, a third monitored area 406, a fourth monitored area 408, a fifth monitored area 410, a sixth monitored area 412, a seventh monitored area 414, and an eighth monitored area 416 each has a respective security monitoring system 100 of the present invention.

When an undesired condition at any of the monitored areas in FIG. 4 is detected by the respective security monitoring system 100, the image of that monitored area is faxed to a security post 418 such as a police station assigned to those areas. A security guard at the police station 418 examines the faxed image to determine whether travel to that monitored area is warranted. Thus, wasted time in travel to a monitored area from a false alarm is minimized with the present invention. Because any number of monitored areas may easily send a fax to the police station 418, one security post such as the police station 418 may monitor a large number of areas.

In addition, the image from a monitored area may be faxed to a plurality of security posts further ensuring prompt response to an undesired condition. If the monitored area 414 is a place of business for example, a fax of the image of the monitored area may be faxed to both the police station 418 and to an owner of the business 420. With multiple security posts being apprised of the undesired condition, the chances of a more prompt response is enhanced in case one security post is not occupied by a security guard.

In addition, the present invention may also send a JPEG colored image file via E-mail. Such a replication of the image is likely to be a higher quality image with color and better resolution than just a faxed image. Thus, the undesired condition at a monitored area may be better resolved with the E-mailed JPEG file.

Figure 5:
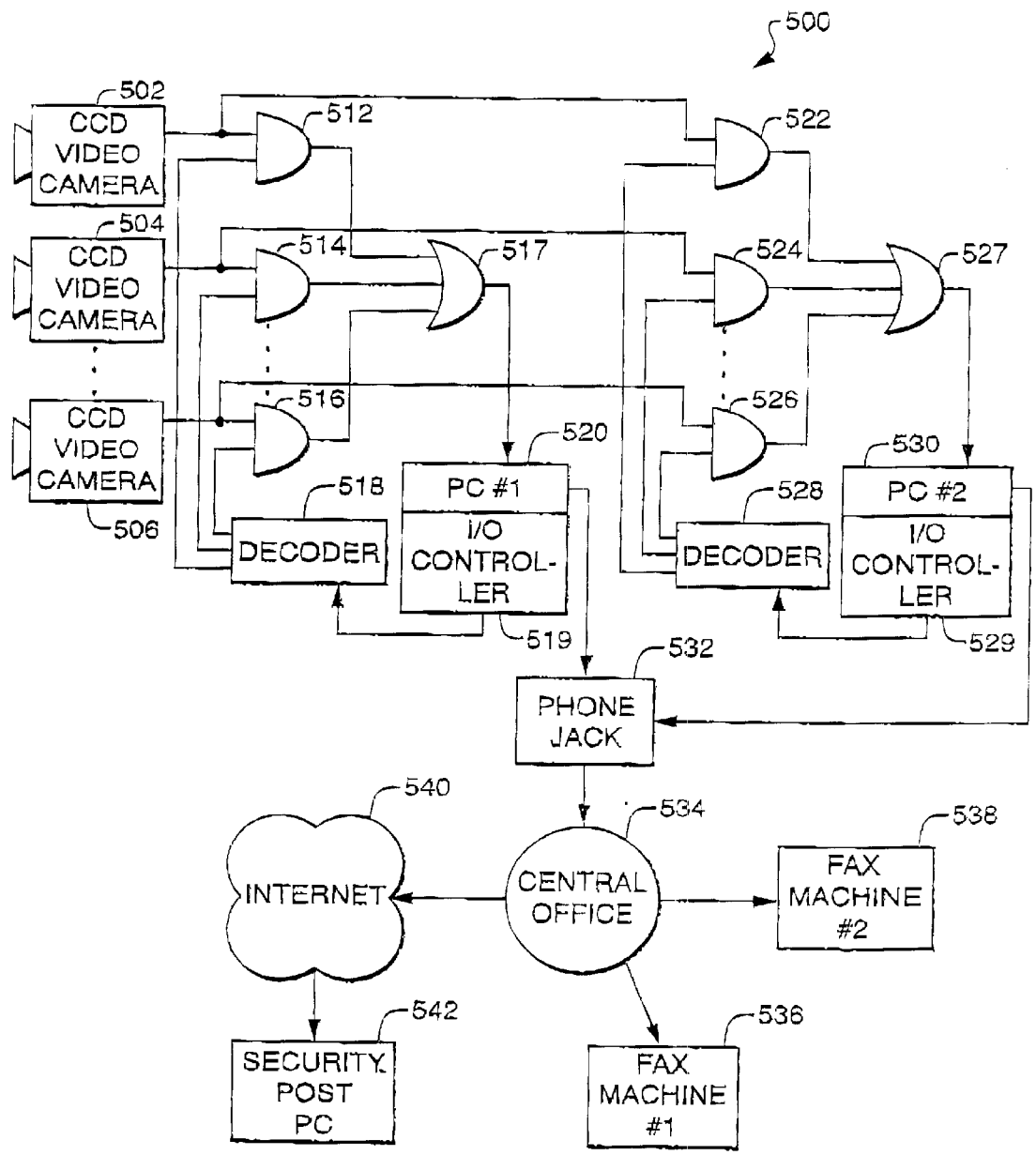
FIG. 5 shows a block diagram of the components of a security monitoring system using a plurality of cameras, according to another embodiment of the present invention.

Referring to FIG. 5, a security system 500, according to another embodiment of the present invention, includes a plurality of CCD video cameras including a first camera 502, a second camera 504, and up to an $n^{th}$ camera 506. Each of the plurality of cameras monitors a respective monitored area. For example, the plurality of cameras may monitor a respective room or a respective field of view within a large department store. The output from the first camera 502 is coupled to a first AND gate 512, the output from the second camera 504 is coupled to a second AND gate 514, and the output from the third camera 506 is coupled to a third AND gate 516. The outputs from the first, second, and third AND gates 512, 514, and 516 go through a first OR gate 517.

A respective input to each of the first, second, and third AND gates 512, 514, and 516 is coupled to a respective output of a first decoder 518 which is coupled to a first I/O (Input/Output) controller 519 of a first computer 520. The first computer 520 selects the output from one of the plurality of cameras 502, 504, and 506 for analyzing the image from that one camera via the first I/O controller 519. A control signal from the first I/O controller 519 is decoded by the first decoder 518 to gate the output from one of the plurality of cameras 502, 504, and 506. The output of the first OR gate 517 is coupled to the first computer 520.

In this manner, the first computer 520 selects via the first I/O controller 519, the output from one of the plurality of cameras 502, 504, and 506 for analyzing the image from that one camera. The first computer 520 includes an image processor similar to that shown in FIG. 1 for analyzing the images from that one selected camera. Thus, the first computer 520 may select any one of the plurality of cameras 502, 504, and 506 for analyzing the images from that one selected camera at any given time.

Similarly, the output from the first camera 502 is coupled to a fourth AND gate 522, the output from the second camera 504 is coupled to a fifth AND gate 524, and the output from the third camera 506 is coupled to a sixth AND gate 526. The outputs from the first, second, and third AND gates 522, 524, and 526 go through a second OR gate 527.

A respective input to each of the fourth, fifth, and third AND gates 522, 524, and 526 is coupled to a respective output of a second decoder 528 which is coupled to a second I/O (Input/Output) controller 529 of a second computer 530. The second computer 530 selects the output from one of the plurality of cameras 502, 504, and 506 for analyzing the image from that one camera via the second I/O controller 529. A control signal from the second I/O controller 529 is decoded by the second decoder 528 to gate the output from one of the plurality of cameras 502, 504, and 506. The output of the second OR gate 527 is coupled to the second computer 530.

In this manner, the second computer 530 selects via the second I/O controller 529, the output from one of the plurality of cameras 502, 504, and 506 for analyzing the image from that one camera. The second computer 530 includes an image processor similar to that shown in FIG. 1 for analyzing the images from that one selected camera. Thus, the second computer 530 may select any one of the plurality of cameras 502, 504, and 506 for analyzing the images from that one selected camera at any given time.

The first computer 520 and the second computer 530 are coupled to a phone jack 532 which is coupled to a central office 534 of a public telephone network. Either the first computer 520 and the second computer 530 may send a fax to a plurality of fax machines including a first fax machine 536 and a second fax machine 538. Alternatively, either the first computer 520 and the second computer 530 may send a JPEG color image as an E-mail via the Internet 540 to a computer 542 at a security post.

By using both the first computer 520 and the second computer 530, a redundant detection of an undesired condition at an monitored area further ensures minimization of false alarms. In addition, if one of the first computer 520 and the second computer 530 is inoperative, then the other computer is ensured of detecting the undesired condition at the monitored area.

The foregoing is by way of example only and is not intended to be limiting. For example, the present invention has been described withe the example image blocks of FIG. 3. However, the present invention may be practiced for any number of image blocks within an image, any number of pixel values, and any number of pixels within an image block, as would be apparent to one of ordinary skill in the art from the description herein. In addition, the algorithm described herein for comparing the first image with the second image is by way of example only and any other types of algorithms for comparing images may be used with the present invention.

The present invention is limited only as defined in the following claims and equivalents thereof.

What is claimed is:

1. A method for notifying at least one security post of an undesired condition at a monitored area, the method including the steps of:

A. creating a first image of said monitored area at a first time point, said first image divided into a plurality of first image blocks using a predefined grid;

B. creating a second image of said monitored area at a second time point, said second image divided into a plurality of second image blocks using said predetermined grid;

C. comparing a said first image block with a corresponding said second image block by performing the steps of
calculating a first average pixel value of said first image block;
calculating a second average pixel value of said corresponding second image block;
calculating a first standard deviation pixel value of said first image block;
calculating a second standard deviation pixel value of said corresponding second image block;
calculating a first x-coordinate pixel massive center of said first image block;
calculating a second x-coordinate pixel massive center of said corresponding second image block;
calculating a first y-coordinate pixel massive center of said first image block;
calculating a second y-coordinate pixel massive center of said corresponding second image block; and D. sending a fax of said second image to said at least one security post if said corresponding second image block is substantially different from said first image block, wherein said first image block is substantially different from said corresponding second image block if said first average pixel value is substantially different from said second average pixel value or if said first standard deviation pixel value is substantially different from said second standard deviation pixel value or if said first x-coordinate pixel massive center is substantially different from said second x-coordinate pixel massive center or if said first y-coordinate pixel massive center is substantially different from said second ycoordinate pixel massive center.

2. The method of claim 1, further comprising the step of:
sending a JPEG color image of said second image as an electronic mail to a predetermined security post if said corresponding second image block is substantially different from said first image block.

3. The method of claim 1, further comprising the steps of:
detecting a remote request for a requested fax of an image of said monitored area;
accepting a fax number to which said requested fax is to be sent; and
sending a fax of said image of said monitored area to said accepted fax number.

4. The method of claim 1, further including the steps of:
repeating steps A, B, C, and D every predetermined time period.

5. The method of claim 1, further comprising the steps of:
selecting one of a plurality of cameras for comparing said first image block and said corresponding second image block from said selected one of said plurality of cameras to detect said undesired condition at a respective monitored area of said selected one of said plurality of cameras.

6. A method for notifying at least one security post of an undesired condition at a monitored area, the method including the steps of:
A. creating a first image of said monitored area at a first time point, said first image divided into a plurality of first image blocks using a predefined grid;
B. creating a second image of said monitored area at a second time point, said second image divided into a plurality of second image blocks using said predetermined grid;
C. comparing a said first image block with a corresponding said second image block, said step of comparing further including the steps of:
calculating a first average pixel value of said first image block;
calculating a second average pixel value of said corresponding second image block;
calculating a first standard deviation pixel value of said first image block;
calculating a second standard deviation pixel value of said corresponding second image block;
calculating a first x-coordinate pixel massive center of said first image block;
calculating a second x-coordinate pixel massive center of said corresponding second image block:
calculating a first y-coordinate pixel massive center of said first image block; and
calculating a second y-coordinate pixel massive center of said corresponding second image block;
wherein said first image is substantially different from said second image if said first average pixel value is substantially different from said second average pixel value or if said first standard deviation pixel value is substantially different from said second standard deviation pixel value or if said first x-coordinate pixel massive center is substantially different from said second x-coordinate pixel massive center or if said first y-coordinate pixel massive center is substantially different from said second y-coordinate pixel massive center;
D. sending a fax of said second image to said at least one security post if said second image is substantially different from said first image;
E. sending a JPEG color image of said second image as an electronic mail to a predetermined security post if said second image is substantially different from said first image;
F. detecting a remote request for a requested fax of an image of said monitored area;
G. accepting a fax number to which said requested fax is to be sent;
H. sending a fax of said image of said monitored area to said accepted fax number; and
I. repeating steps A, B, C, D, E, F, G, and H every predetermined time period.

7. An apparatus for notifying at least one security post of an undesired condition at a monitored area, the apparatus comprising:
a camera for creating a first image of said monitored area at a first time point and for creating a second image of said monitored area at a second time point, said first image divided into a plurality of first image blocks using a predefined grid and said second image divided into a plurality of second image blocks using said predefined grid;
a data storage device for storing said first image blocks and said second image blocks;
an image processor, coupled to said data storage device, for comparing a said first image block with a corresponding said second image block, wherein said image processor, when comparing said first image block with said corresponding second image block, calculates the following parameters,
a first average pixel value of said first image block;
a second average pixel value of said corresponding second image block;
a first standard deviation pixel value of said first image block;
a second standard deviation pixel value of said corresponding second image block;
a first x-coordinate pixel massive center of said first image block;
a second x-coordinate pixel massive center of said corresponding second image block;
a first y-coordinate pixel massive center of said first image block; and
a second y-coordinate pixel massive center of said corresponding second image block; and
a modem, coupled to said image processor, for sending a fax of said second image to said at least one security post if said corresponding second image block is substantially different from said first image block, wherein said first image is substantially different from said second image if said first average pixel value is substantially different from said second average pixel value or if said first standard deviation pixel value is substantially different from said second standard deviation pixel value or if said first x-coordinate pixel massive center is substantially different from said second x-coordinate pixel massive center or if said first y-coordinate pixel massive center is substantially different from said second y-coordinate pixel massive center.

8. The apparatus of claim 7, wherein said modem sends a JPEG color image of said second image as an electronic mail to a predetermined security post if said corresponding second image block is substantially different from said first image block.

9. The apparatus of claim 7, further comprising:
a dual tone multi-frequency detector for detecting a remote request via a phone line for a requested fax of an image of said monitored area and for accepting a fax number entered via a phone line to which said requested fax is to be sent, and wherein said image processor sends a fax of said image of said monitored area to said accepted fax number.

10. The apparatus of claim 7, wherein said image processor repeats comparing another first image to another second image every predetermined time period.

11. The apparatus of claim 7, further comprising:
a plurality of cameras, each camera generating a respective first image at said first time point and a respective second image at said second time point to be compared for detecting said undesired condition at a respective monitored area; and
an I/O controller for selecting one of said plurality of cameras for analyzing the respective first image and the respective second image from said selected one of the plurality of cameras for detecting said undesired condition at said respective monitored area.

12. An apparatus for notifying at least one security post of an undesired condition at a monitored area, the method including the steps of:
a camera for creating a first image of said monitored area at a first time point and for creating a second image of said monitored area at a second time point, said first image divided into a plurality of firs image blocks using a predefined grid and said second image divided into a plurality of second image blocks using said predefined grid;
a data storage device for storing said first image blocks and said second image blocks;
an image processor, coupled to said data storage device, for comparing a said first image block with a corresponding said second image block;
a modem, coupled to said image processor, for sending a fax of said second image to said at least one security post if said corresponding second image block is substantially different from said first image block;
wherein said modem sends a JPEG color image of said second image as an electronic mail to a predetermined security post if said corresponding second image block is substantially different from said first image block;
a dual tone multi-frequency detector for detecting a remote request via a phone line for a requested fax of an image of said monitored area and for accepting a fax number entered via a phone line to which said requested fax is to be sent, and wherein said image processor sends a fax of said image of said monitored area to said accepted fax number;
and wherein said image processor repeats comparing another first image to another second image every predetermined time period;
and wherein said image processor when comparing said first image block with said corresponding second image block calculates the following parameters:
a first average pixel value of said first image block;
a second average pixel value of said corresponding second image block;
a first standard deviation pixel value of said first image block;
a second standard deviation pixel value of said corresponding second image block;
a first x-coordinate pixel massive center of said first image block;
a second x-coordinate pixel massive center of said corresponding second image block;
a first y-coordinate pixel massive center of said first image block; and
a second y-coordinate pixel massive center of said corresponding second image block;
and wherein said first image is substantially different from said second image if said first average pixel value is substantially different from said second average pixel value or if said first standard deviation pixel value is substantially different from said second standard deviation pixel value or if said first x-coordinate pixel massive center is substantially different from said second x-coordinate pixel massive center or if said first y-coordinate pixel massive center is substantially different from said second y-coordinate pixel massive center.

13. An apparatus for notifying at least one security post of an undesired condition at a monitored area, the apparatus comprising:
means for creating a first image of said monitored area at a first time point and for creating a second image of said monitored area at a second time point, said first image divided into a plurality of first image blocks using a predefined grid and said second image divided into a plurality of second image blocks using said predefined grid;
means for storing said first image blocks and said second image blocks;
means for comparing a said first image block with a corresponding said second image block, wherein said means for comparing, when comparing said first image block with said corresponding second image block, calculates the following parameters,
a first average pixel value of said first image block;
a second average pixel value of said corresponding second image block;
a first standard deviation pixel value of said first image block;
a second standard deviation pixel value of said corresponding a second image block;
a first x-coordinate pixel massive center of said first image block;
a second xcoordinate pixel massive center of said corresponding second image block;
a first y-coordinate pixel massive center of said first image block; and
a second y-coordinate pixel massive center of said corresponding second image block; and
means for sending a fax of said second image to said at least one security post if said corresponding second image block is substantially different from said first image block, wherein said first image is substantially different from said second image if said first average pixel value is substantially different from said second average pixel value or if said first standard deviation pixel value is substantially different from said second standard deviation pixel value or if said first x-coordinate pixel massive center is substantially different from said second x-coordinate pixel massive center or if said first y-coordinate pixel massive center is substantially different from said second y-coordinate pixel massive center.

14. The apparatus of claim 13, further comprising:
means for sending a JPEG color image of said second image as an electronic mail to a predetermined security post if said corresponding second image block is substantially different from said first image block.

15. The apparatus of claim 13, further comprising:

means for detecting a remote request via a phone line for a requested fax of an image of said monitored area and for accepting a fax number entered via a phone line to which said requested fax is to be sent, and wherein said image processor sends a fax of said image of said monitored area to said accepted fax number.

16. The apparatus of claim 13, further comprising:

means for selecting one of a plurality of cameras for comparing a respective first image and a respective second image from said selected one of said plurality of cameras to detect said undesired condition at a respective monitored area of said selected one of said plurality of cameras.

* * * * *